United States Patent [19]
Cummins

[11] Patent Number: 6,140,795
[45] Date of Patent: Oct. 31, 2000

[54] VARIABLE SPEED CONTROL FOR AC INDUCTION MOTORS

[76] Inventor: Michael D. Cummins, 2869 Long Lake Dr., Titusville, Fla. 32780

[21] Appl. No.: 09/360,176

[22] Filed: Jul. 23, 1999

[51] Int. Cl.[7] .................................................. H02P 3/18
[52] U.S. Cl. ........................ 318/815; 318/254; 318/138; 318/439; 318/807; 318/599; 318/801
[58] Field of Search ..................................... 318/254, 138, 318/439, 750, 807, 599, 801, 805, 815

[56] References Cited

U.S. PATENT DOCUMENTS

| | | | |
|---|---|---|---|
| 5,592,062 | 1/1997 | Bach | 318/805 |
| 5,661,379 | 8/1997 | Johnson | 318/139 |
| 5,838,134 | 11/1998 | Cummins | 318/750 |

*Primary Examiner*—Karen Masih
*Attorney, Agent, or Firm*—J. Sanchelima

[57] ABSTRACT

A speed control apparatus for varying the speed of an AC motor while maintaining the torque and power constant over a range of angular speeds The AC motor is driven by a D.C. source. A universal conmutator capable of providing two symmetrical non-contending signals with a frequency that can be selectively varied. A microprocessor unit for monitoring the frequency of the signals and control proportionally varying the duty cycle of the signals calculates the necessary duty cycle to maintain the torque constant over a range of angular speeds.

2 Claims, 6 Drawing Sheets

PSC Motor Connection

VARIABLE SPEED CONTROL FOR AC INDUCTION MOTORS

II. BACKGROUND OF THE INVENTION

1. Field of the Invention

The present invention relates to variable speed controls for AC motors, and more particularly, to those that are driven by DC sources.

2. Description of the Related Art

In line operated AC induction motors, speed/torque/efficiency is related to line voltage and frequency (voltage/frequency). For example, a 2-pole AC motor designed to operate at a line voltage/frequency of 120 volts AC and 60 Hz rotates at 3600 R.P.M. and depending on the winding characteristics will provide a given torque. If this same motor is operated at 30 Hz. (½ the frequency), the motor should rotate at 1800 R.P.M. (half the speed) but at greater torque with the consequent increase in power dissipation in the form of heat generated. Thus, to maintain the same torque (and similar power dissipation) at this lower frequency, the voltage needs to be reduced to one half of the original 120 volts AC, or 60 volts AC. The V/f ratio is then maintained substantially constant at 2:1. If this ratio is not maintained, then the torque at 30 Hz. will be 200% the torque at 60 Hz. with the consequent waste of power and heat.

On the other hand, if the motor needs to be operated at twice the frequency to achieve double the rotational speed (7,200 R.P.M.), the applied voltage would have to be increased to 240 volts AC to provide the same torque, thus maintaining the same 2:1 ratio. Therefore, by varying the voltage in direct proportion to the frequency variations, the torque and power dissipation is maintained constant over an angular speed range for a given motor. However, in practice, this is t to do since the line voltage in the public network is set at a constant frequency. This accounts for the inefficient behavior of most motors at start up since they are designed keeping their final speed in mind.

With the present invention, the motor torque output and power dissipation is kept constant over an angular speed range by varying the duty cycle in symmetrical signals that, when integrated, provide substantially the same amount of energy as if the voltage (in the case of the sinusoidal line voltage) had been varied. The voltage is maintained constant but as the frequency is lowered, the duty cycle is also lowered, and vice versa. Therefore, "V/f" is substantially equivalent to "duty cycle/f".

III SUMMARY OF THE INVENTION

It is one of the main objects of the present invention to provide a variable speed control for AC motors that keeps the torque output of the motor and the dissipated power substantially constant over an angular speed range.

It is another object of this invention to provide such a device that is controlled with a D.C. source.

It is still another object of the present invention to provide such a control device that does not require ant mechanical parts.

It is yet another object of the invention to provide such a device that is inexpensive to manufacture and maintain while retaining its effectiveness.

Further object of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF TH PREFERRED EMBODIMENT

Figure 1:
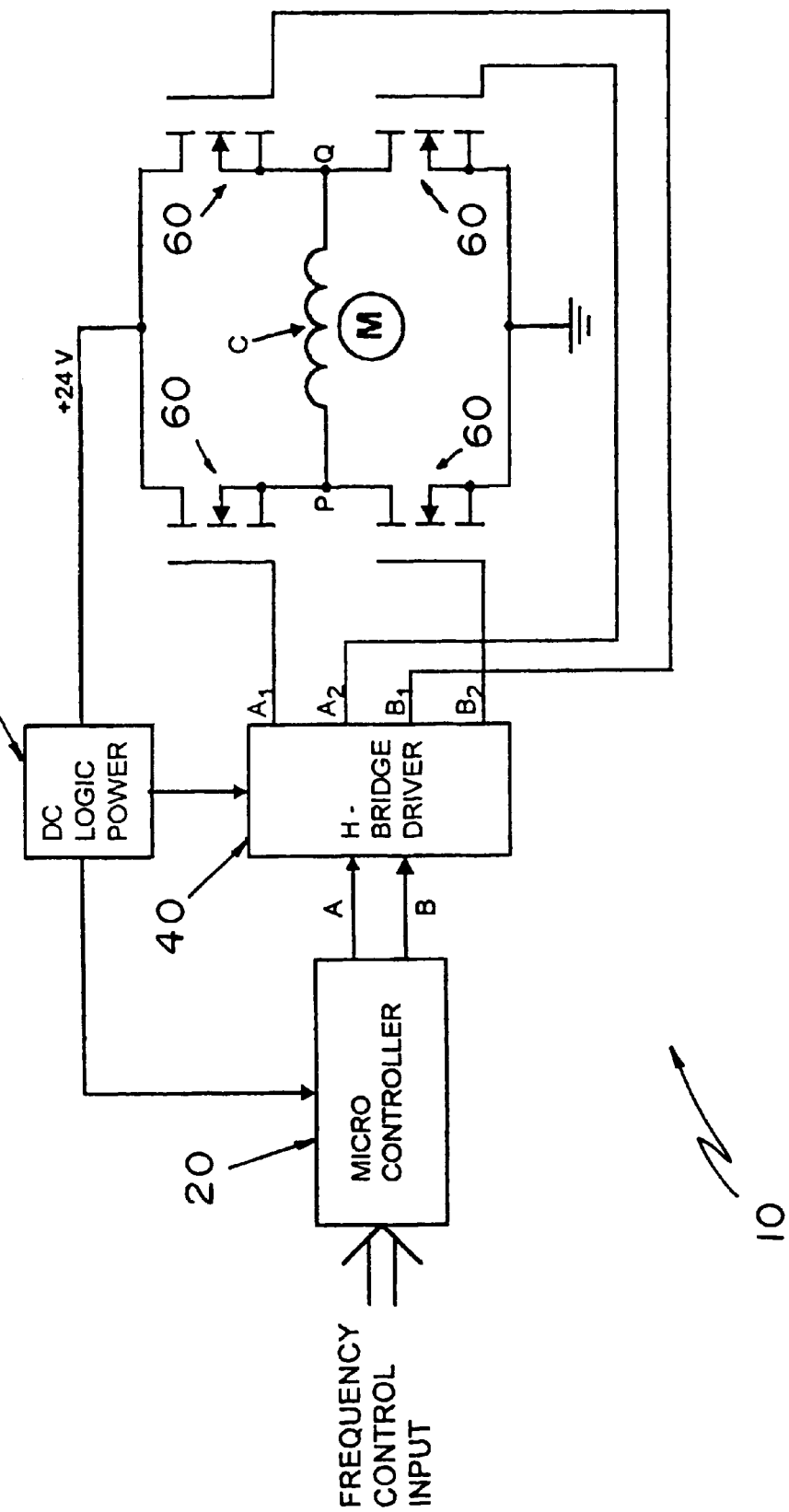
FIG. 1 represents an electronic diagram having a switched H bridge driving the coil of an induction AC motor, in accordance with the present invention.

Referring now to the drawings, where the present invention is generally referred to with numeral 10, it can be observed that it basically includes universal conmutator or microcontroller 20 that activates H-bridge driver circuit 40 that in turn activates t e electronic switches in H-bridge 60. A suitable D.C. power supply 80 feeds these circuits and coil C of induction motor M.

Universal conmutator or microcontroller 20 is implemented with a device as described in my patent entitled Universal Commutator for A.C. motors issued on Nov. 17, 1998 under U.S. Pat. No. 5,838,134, incorporated by reference here, and permits a user to avoid he contention in the switching operation through the implementation of "dead times". But, additionally, a user controls the duty cycle of the driving signals for phases "A" and "B" to keep the necessary ratio between the voltage applied and the frequency (or the angular speed of the motor). At start up, for instance, the motor tries to overcome the inertia of the rotor and achieve, as soon as possible, the speed at which the initial frequency commands it to be rotating at. Not being able to instantaneously achieve the rotational speed for even an initial low frequency (for instance, 30 Hz.) most of the electrical energy received is wasted as heat dissipation. A the rotational speed approaches the 1800 RPM (30×60), the proportion oft motor torque increases with respect to the power/heat dissipated thus increasing its efficiency. When the frequency is increased again to, for i stance 60 Hz., the motor tries to immediately overcome the inertia and being the speed to 3600 R.P.M. requiring a higher voltage to maintain t e voltage to frequency ratio. Since the voltage is constant from D.C. power source 80, then the only way to increase the energy (in direct proportion to the voltage) is by increasing the duty cycle of the voltage applied to coil C through the electronic switches of bridge 60 to achieve a substantially constant (duty cycle/f) ratio, that for a given motor, will have a constant torque over a range of frequencies (and rotational speeds). The signal being delivered is symmetrical and can be readily controlled by conmutator or microcontroller 20.

Figure 2:
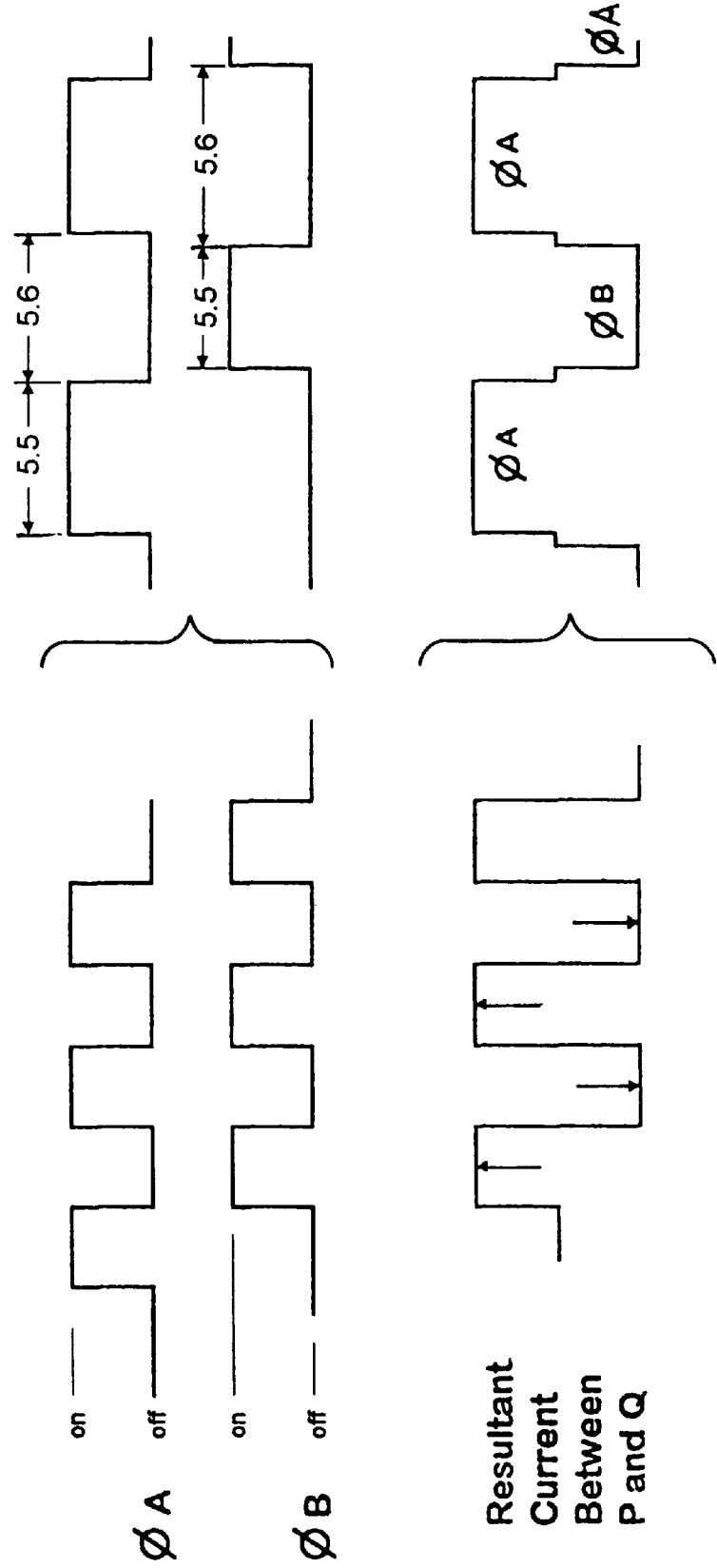
FIG. 2 illustrates the timing chart for phases A and B applied to the switching devices in FIG. 1 for a constant voltage and a frequency of 90 Hz., and the resulting current across stator coil C.

As it can be seen from FIG. 2, a motor M designed to achieve a predetermined torque at, for instance, 90 Hz. is switched with signals in phase "A" and "B" that complement each other to almost 100% duty cycle. As described in the parent, there is a "dead time" period required to avoid contention between the signals thus requiring the duty cycle for the maximum reference frequency to be some hat less than 100%. The period for a 90 Hz. signal is 1/90 of a second, or 11.1 milliseconds, approximately. The "dead time" is selected to be, in this illustration, 0.1 milliseconds. The ON time is selected to be 5.5 milliseconds and the OFF time (that includes the "dead time") is the balance, or 5.6 mill seconds. Both signals, phase "A" and "B" are symmetrical and permit motor M to operate at a given torque and heat dissipation.

Figure 3:
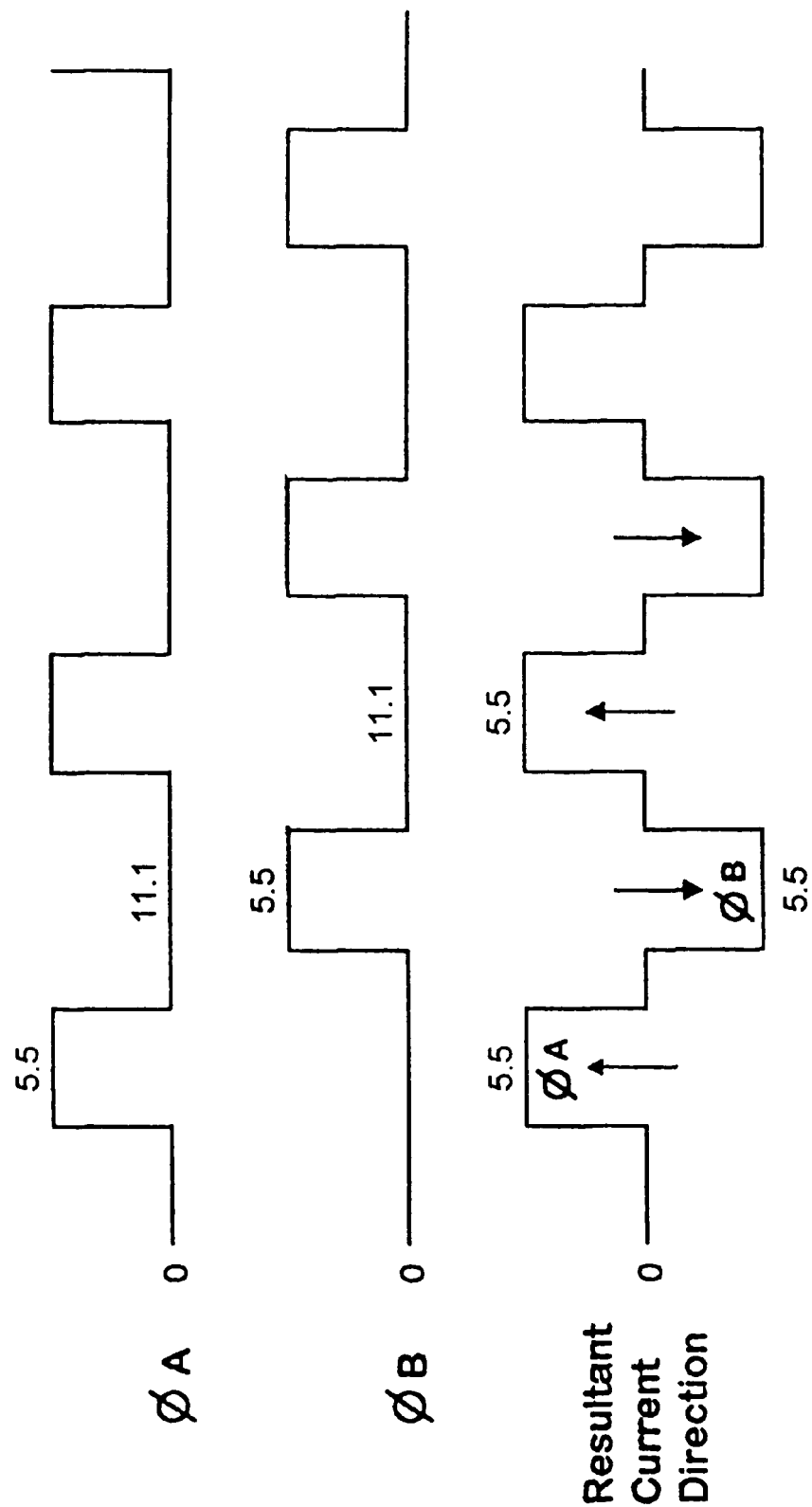
FIG. 3 illustrates the timing chart for phases A and B applied to the switching devices in FIG. 1 for a constant voltage and a frequency of 60 Hz., and the resulting current across stator coil C.
Figure 4:
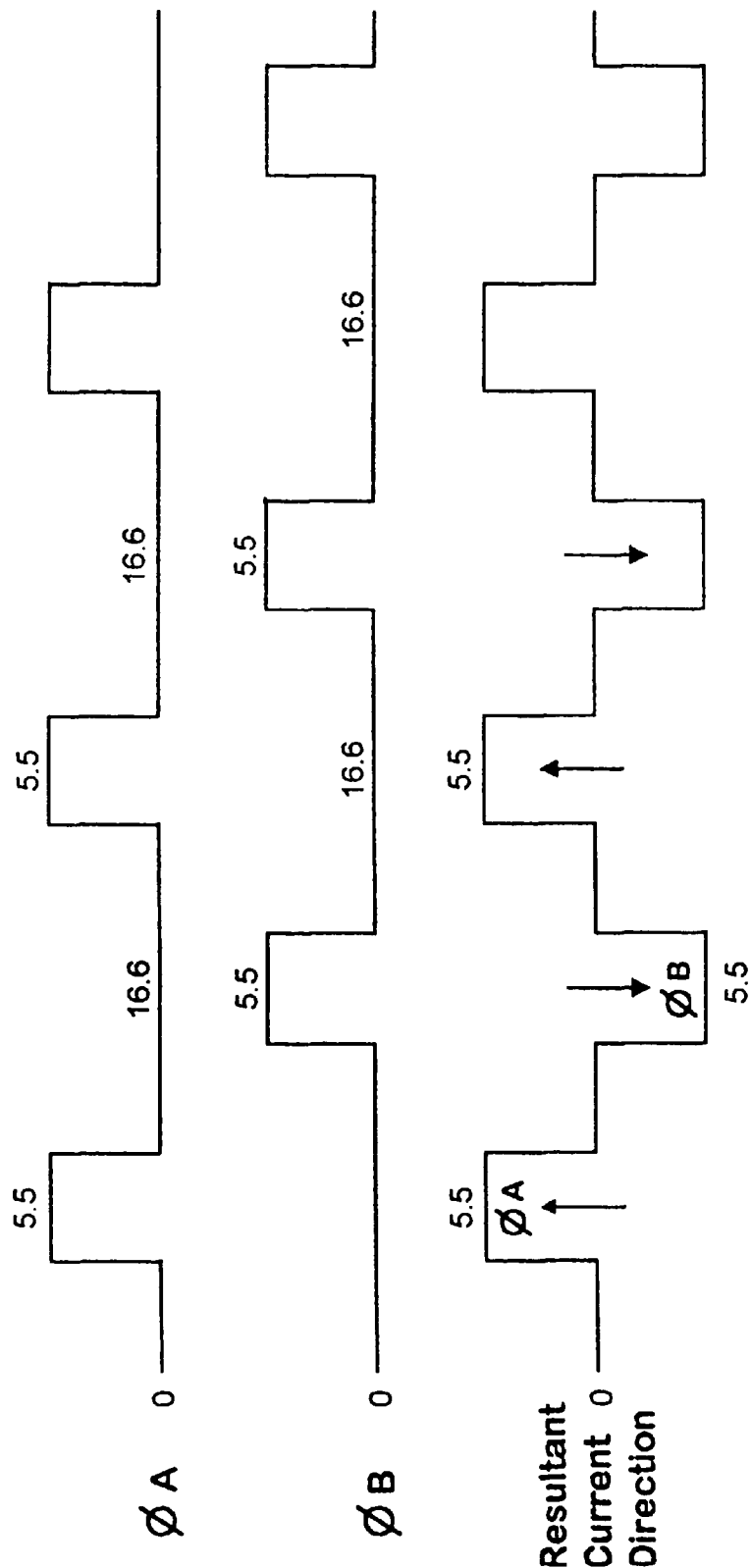
FIG. 4 illustrates the timing chart for phases A and B applied to the switching devices in FIG. 1 for a constant voltage and a frequency of 45 Hz., and the resulting current across stator coil C.
Figure 5:
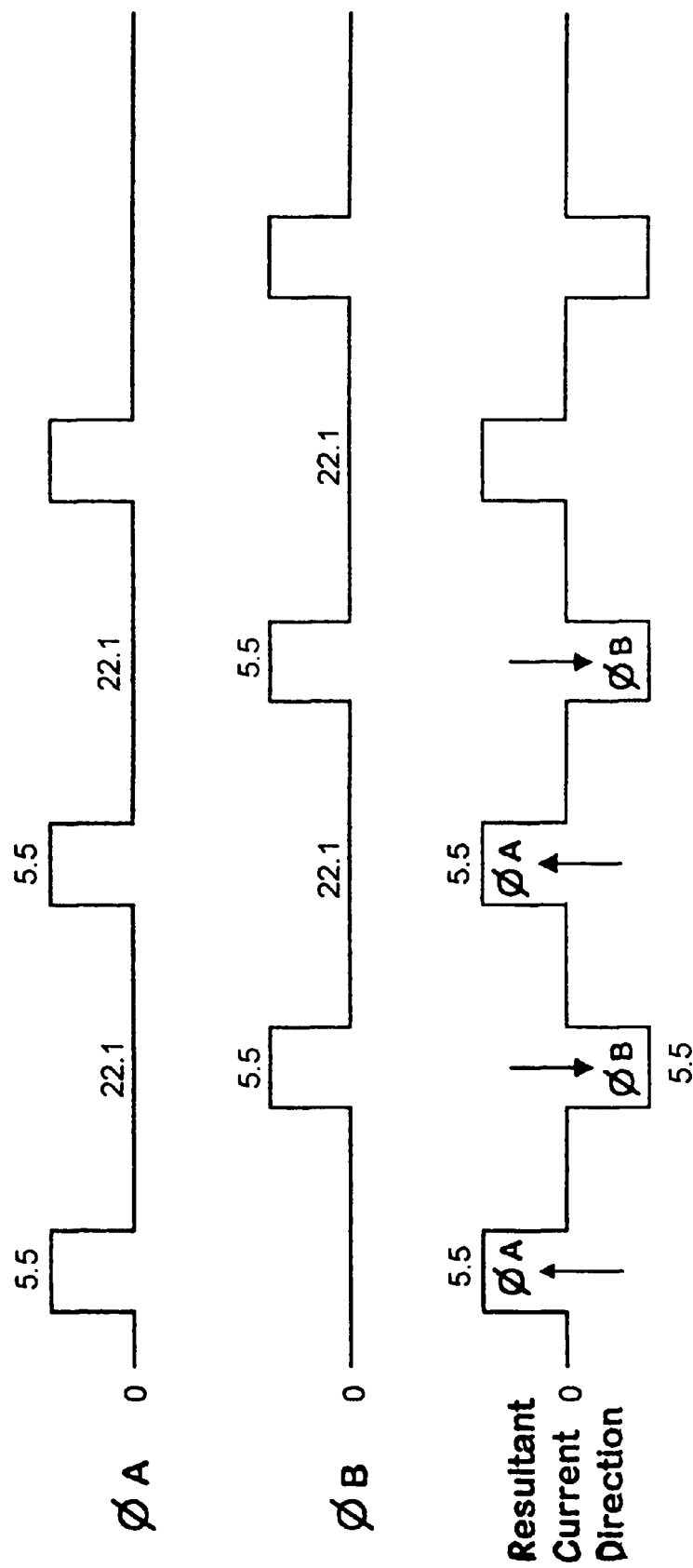
FIG. 5 illustrates the timing chart for phases A and B applied to the switching devices in FIG. 1 for a constant voltage and a frequency of 30 Hz., and the resulting current across stator coil C.

In FIG. 3, the speed of the same motor M is brought down one third by bringing the frequency down to 60 Hz. Instead of lowering the voltage (which is constant in the D.C. power supply) the duty cycle of the signals are brought down one third. Since the period at 60 Hz. is 1/60 of a senond, or 16.7 milliseconds, then the ON signal is one third less than the OFF signal.

If the initial frequency=90 Hz. and the ratio of voltage/frequency is changed to ON time/frequency, then If "D"=duty cycle and "f"=frequency, we can say:

1.00 is to 90 Hz. like

"D" is to "f"

Then, D=f/90 and $D=(ON_A+ON_B)/T$ since $ON_A=ON_B$, then $ON=D*T/2$

Keeping ON a constant, then

For "f"=90 then "D"=1.00, "T"=11.1 and ON=5.5, OFF=5.6

For "f"=60 then "D"=2/3, "T"=16.7 and ON=5.5, OFF=11.1

For "f"=45 then "D"=1/2, "T"=22.2 and ON=5.5, OFF=16.7

For "f"=30 then "D"=1/3, "T"=33.3 and ON=5.5, OFF=22.1

With this design configuration, the ON time is constant at 5.5 approx. for all speeds and the OFF/deadtime is changed to provide symmetrical timing of the waveshape as the frequency changes, but not equal to ON-to-OFF timing, as seen in FIGS. 2, 3, 4, and 5. The waveshape must be symmetrical to provide optimum power transfer into the motor and not generate unwanted heat and noise out of the motor. This allows the power and torque to remain relatively constant over the chosen frequency range.

Figure 6:
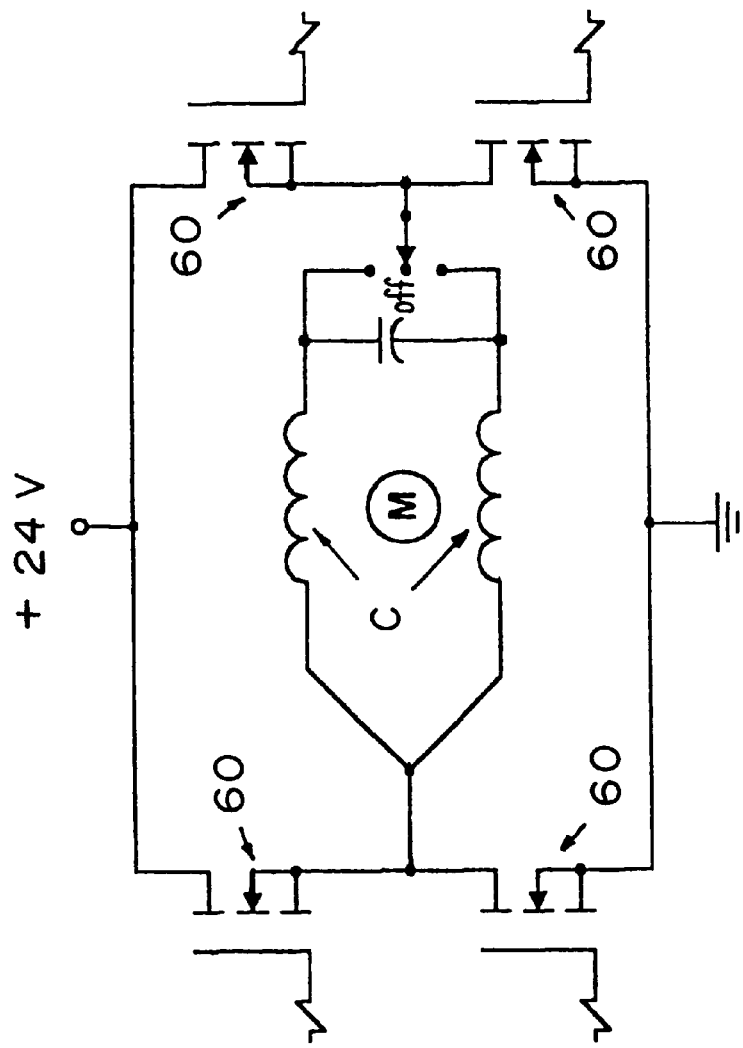
FIG. 6 represents an electronic digram for a PSC motor connection.

In FIG. 6 a different type of motor is Shown with similar results.

The foregoing description conveys th best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A variable speed control apparatus for an induction AC motor having a coil with two terminals and powered from a D.C. source, comprising:

A) a universal conmutator for providing first and second symmetrical and non-contending signals, said signals having the same frequency that is selectively varied by a user, and means for varying the duty cycle of said signals;

B) an H-bridge circuit having two outputs connected, respectively, to an AC motor terminals and including two pairs of control inputs, each of said airs connected to said first and second signals; and C) means for controlling said means for varying the duty cycle to cause the duty cycle of said signals to be increased and decreased proportionally with increments and reductions, respectively, in the frequency of said signals.

2. The apparatus set forth in claim 1 wherein a predetermined maximum frequency is used as a reference for the maximum duty cycle.

* * * * *